United States Patent
Poole

(10) Patent No.: US 12,508,858 B2
(45) Date of Patent: Dec. 30, 2025

(54) LIGHTWEIGHT LAND AND WATER VEHICLE

(71) Applicant: FowlOut, LLC, Leesburg, VA (US)

(72) Inventor: Erick Poole, Leesburg, VA (US)

(73) Assignee: FowlOut, LLC, Leesburg, VA (US)

( * ) Notice: Subject to any disclaimer, the term of this patent is extended or adjusted under 35 U.S.C. 154(b) by 718 days.

(21) Appl. No.: 17/948,361

(22) Filed: Sep. 20, 2022

(65) Prior Publication Data
US 2023/0087459 A1 Mar. 23, 2023

Related U.S. Application Data

(60) Provisional application No. 63/261,387, filed on Sep. 20, 2021.

(51) Int. Cl.
*B60F 3/00* (2006.01)
*B63H 7/02* (2006.01)

(52) U.S. Cl.
CPC .......... *B60F 3/0061* (2013.01); *B60F 3/0007* (2013.01); *B60F 3/0038* (2013.01); *B63H 7/02* (2013.01)

(58) Field of Classification Search
CPC .... B60F 3/0061; B60F 3/0007; B60F 3/0038; B60F 3/0076; B60F 3/0069; B63H 1117/02; B63H 7/02; B63B 35/34
See application file for complete search history.

(56) References Cited

U.S. PATENT DOCUMENTS

| | | | | |
|---|---|---|---|---|
| 1,179,014 A | * | 4/1916 | Lyall | B63H 7/02 440/37 |
| 3,903,832 A | * | 9/1975 | Ishida | B63B 1/20 440/37 |
| 2011/0263166 A1 | * | 10/2011 | Talos | B63H 7/02 440/37 |
| 2016/0167470 A1 | * | 6/2016 | Seydoux | B63H 7/02 244/2 |
| 2017/0291592 A1 | * | 10/2017 | Schulz | B63B 1/322 |

* cited by examiner

*Primary Examiner* — Andrew Polay
(74) *Attorney, Agent, or Firm* — Christopher B. Kilner; Millen, White, Zelano & Branigan, P.C.

(57) ABSTRACT

A lightweight vehicle useful for harassing wildlife/waterfowl includes an elongated body/fuselage with a motor-powered propeller in the front and a vertical tail with a controllable rudder in the rear. The vehicle is able to travel over land or water on a pair of elongated floats having a ski-type shape that support the vehicle. The vehicle is made of lightweight materials such as carbon fiber so that it can travel over water, ice, snow, and mown grass without damaging the grass. The vehicle may be remotely controlled or autonomous.

19 Claims, 3 Drawing Sheets

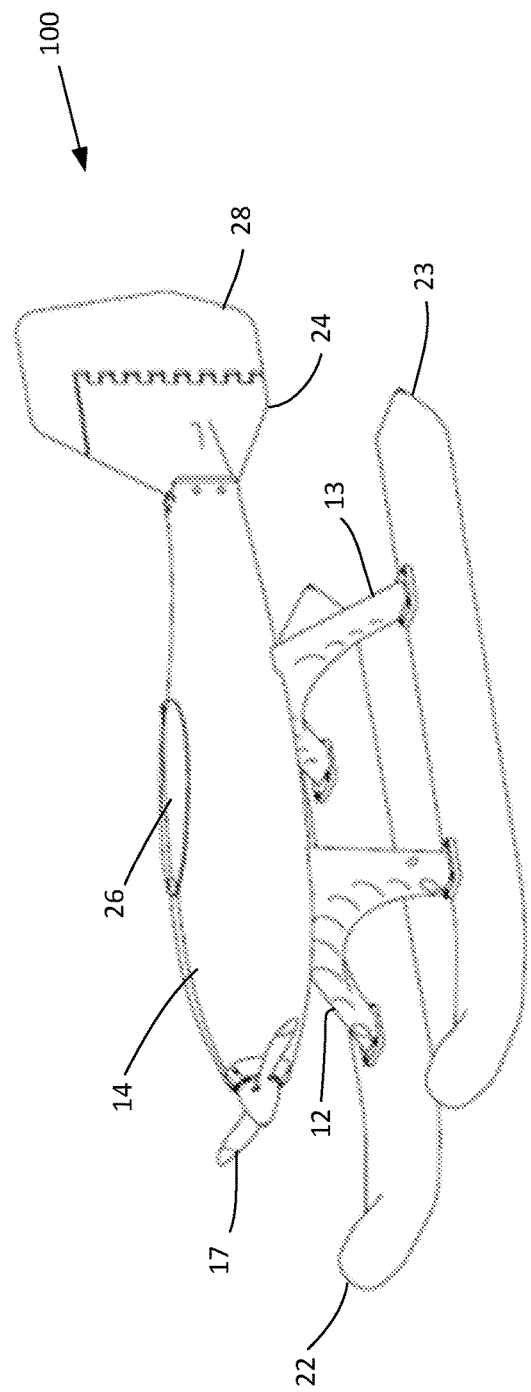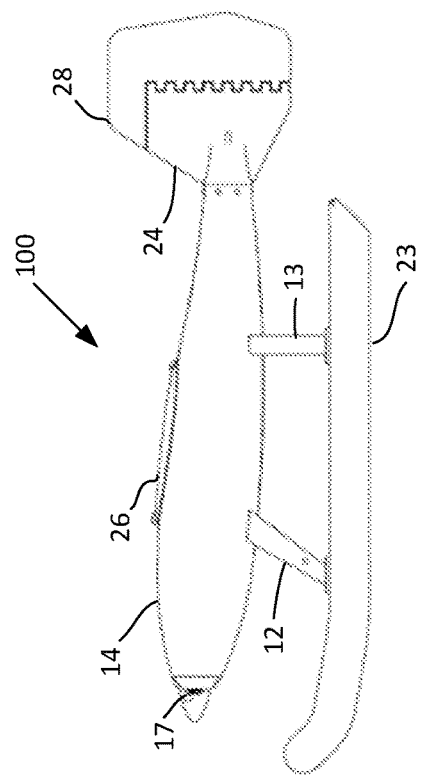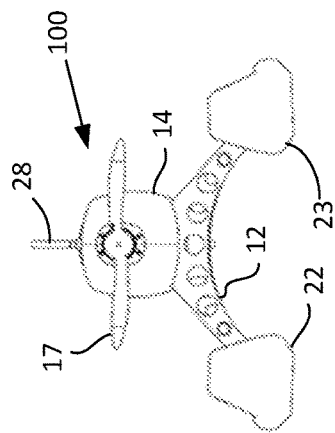

LIGHTWEIGHT LAND AND WATER VEHICLE

RELATED APPLICATIONS

This application claims priority to U.S. Provisional Application No. 63/261,387, filed Sep. 20, 2021, which is hereby incorporated by reference in its entirety for all purposes.

BACKGROUND

Wildlife, and waterfowl in particular, have become an immense nuisance and financial burden for airports, golf courses, corporate office parks, playing fields, and municipal parks to name a few. Many deterrent techniques have been attempted including lasers, lights, border collies, silhouettes of predators, and many other creative ideas. The United States Department of Agriculture's Wildlife Services program estimated in 2017 that a single county in New Jersey was suffering from up to $750,000.00 in damages annually from Canada Geese alone.

Several golf courses surveyed in Northern Virginia are spending on average $40,000.00 annually on harassment techniques of various types that are recurring, annual costs. According to data obtained from the Federal Aviation Administration, civilian flights based in the U.S. reported 14,661 collisions with wildlife in 2018. Worldwide it is estimated these strikes cause about $1.2 billion a year in damage.

In addition to such damage, goose droppings contain over 180 different types of bacteria (including *E-coli*) and have rendered thousands of sports and playing fields useless.

Prior techniques for wildlife control have proven to be unsuccessful.

BRIEF DESCRIPTION OF THE DRAWINGS

FIG. 1 is a perspective view of an example vehicle.
FIG. 2 is a front view of an example vehicle.
FIG. 3 is a side view of an example vehicle.

DETAILED DESCRIPTION

Figure 4:
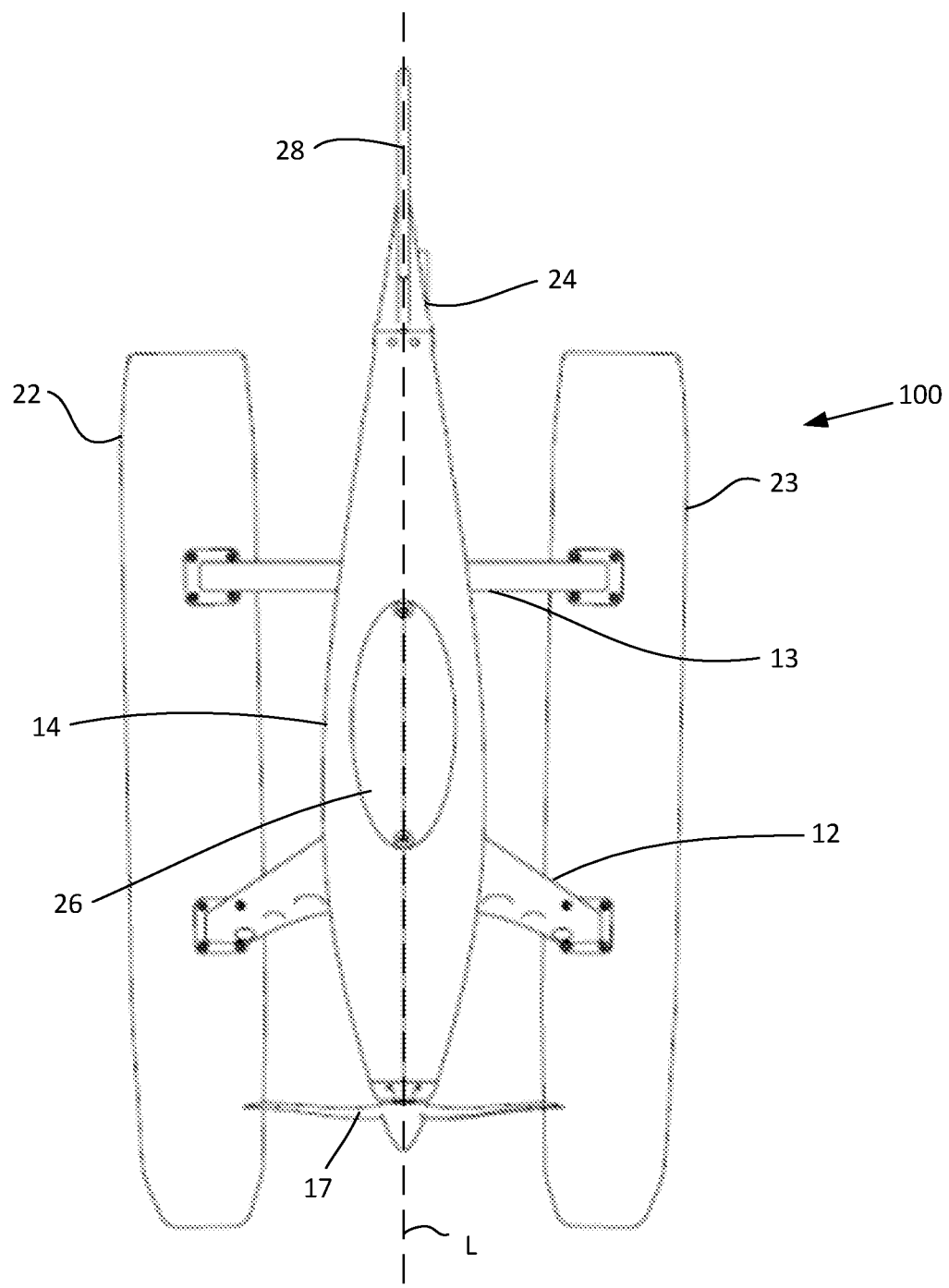
FIG. 4 is a top view of an example vehicle.

The present disclosure relates to a lightweight vehicle that is useful for harassing wildlife, and waterfowl in particular, to keep the wildlife away from airports, golf courses, corporate office parks, playing fields, and municipal parks, and the like. The vehicle may be large enough to be considered a predator to the wildlife, but small enough to be easily stored and transported, and light enough (e.g., less than 5 pounds) to move easily across various surfaces. The vehicle includes an elongated body or fuselage with a motor-powered propeller in the front and a vertical tail with a controllable rudder in the rear. The vehicle is able to travel over land or water supported on a pair of elongated floats having a ski-type shape with a flat bottom. The vehicle is made of lightweight materials such as carbon fiber so that it can travel over areas where wildlife such as waterfowl may be a nuisance such as water, ice, snow, and sand, as well as over mown grass without damaging the grass. As the vehicle is intended to travel over water, ice, and land, it does not include any operational wings. It also does not include any operational wheels which might leave marks on soft surfaces, such as sand traps or rain-soaked greens. In a basic implementation, the vehicle may be remotely controlled. In more complex implementations, the vehicle may be autonomous or semi-autonomous.

In one or more implementations of the present disclosure, a vehicle can include a body having an elongated shape with a front and a rear disposed on a longitudinal axis, a motor attached to the front the body, vertical tail attached to the rear of the body, a rudder attached to the vertical tail, a propeller attached to the motor, and pair of floats disposed below and spaced from the body. The vehicle does not include any operational wings or wheels, is sufficiently lightweight to travel across water on the pair of floats, and is sufficiently lightweight to travel across mown grass on the pair of floats without damaging the mown grass.

In an implementation, each float may have an elongated ski-type shape with a flat bottom and a upwardly curved front portion.

In another implementation, the pair of floats may be disposed substantially parallel to the longitudinal axis of the body.

In an implementation, the vehicle may further include a plurality of struts attaching the pair of floats to the body. The plurality of struts may include a substantially arc-shaped front strut attached to a respective float at either end and the body at a central portion, and a substantially arc-shaped rear strut attached to a respective float at either end and the body at a central portion.

In another implementation, the body and the pair of floats may be hollow and formed of carbon fiber.

In a further implementation, the tail and rudder may be formed of carbon fiber.

In an implementation, the vehicle may be approximately 2 feet wide, approximately 2 feet tall, approximately 4-5 feet long, and may weigh approximately 4-5 pounds.

In various implementations, the body and the pair of floats may comprise foam, and the tail and rudder may comprise carbon fiber.

In one or more implementations of the present disclosure, a vehicle can include a fuselage having a front and a rear disposed along a longitudinal axis, motor attached to the front the fuselage, a vertical tail attached to the rear of the fuselage, a rudder attached to the vertical tail, a propeller attached to the motor, and a pair of floats disposed below and spaced from the fuselage, wherein the lightweight vehicle does not include any operational wings or wheels, and each float has an elongated ski-type shape with a flat bottom and a upwardly curved front portion.

In an implementation, the vehicle may be sufficiently lightweight to travel across water on the pair of floats and sufficiently lightweight to travel across mown grass on the pair of floats without damaging the mown grass.

In another implementation, the pair of floats may be disposed substantially parallel to the longitudinal axis of the fuselage.

In an implementation, the vehicle may further include a plurality of struts attaching the pair of floats to the fuselage. The plurality of struts may include a substantially arc-shaped front strut attached to a respective float at either end and the fuselage at a central portion, and a substantially arc-shaped rear strut attached to a respective float at either end and the fuselage at a central portion.

In another implementation, the fuselage and the pair of floats may be hollow and formed of carbon fiber. In an implementation, the tail and rudder may be formed of carbon fiber.

In an implementation, the vehicle may include a radio control (RC) receiver disposed in the fuselage for operatively controlling the motor and the rudder.

In a further implementation, the motor may be a 1000 kV electric motor driven by a 150 amp speed controller connected to the RC receiver and powered by a rechargeable battery.

In another implementation, the propeller may have an 11 inch diameter and a 7 inch pitch (11×7 propeller).

Figure 5:
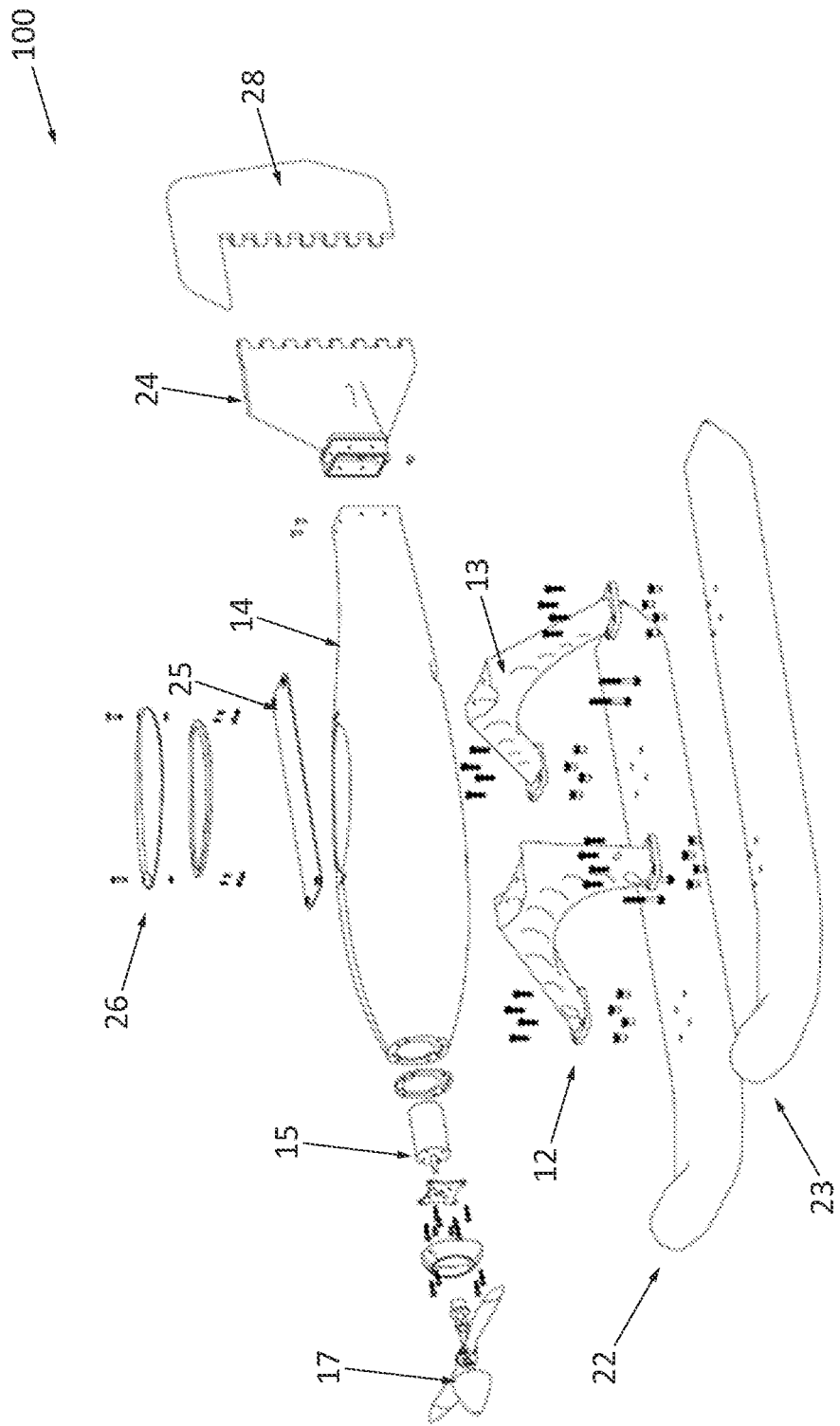
FIG. 5 is an exploded view of an example vehicle and a parts list.

A perspective view of an example vehicle 100 is illustrated in FIG. 1, a front view of vehicle 100 is illustrated in FIG. 2, a side view of vehicle 100 is illustrated in FIG. 3, a top view of vehicle 100 is illustrated in FIG. 4, and an exploded view of vehicle 100 is illustrated in FIG. 5.

With regard to FIGS. 1-5, an implementation of an example vehicle 100 for control of wildlife, such as for harassment of waterfowl, is illustrated.

Vehicle 100 includes a fuselage or body 14. The fuselage or body 14 is elongated and has front and rear portions disposed along a longitudinal axis L (see FIG. 4). The fuselage or body 14 is at least partially hollow so as to house a motor 15 and an electronics board 25, which may include a radio control (RC) receiver, speed controller circuitry, rudder control circuitry, charging circuitry, and rechargeable batteries, such as Lithium Polymer (LiPo) batteries. The fuselage or body 14 may include an access plate or cover 26 to provide access to interior components. While illustrated at the top, other locations for the access plate or cover 26 are possible, such as the bottom of the fuselage or body 14 or portions adjacent the propeller 17 or tail 24. The fuselage or body 14 is formed to be lightweight, and may be made, for example, of monocoque carbon fiber, foam, or combinations thereof. In typical implementations, the fuselage or body 14 will have a streamlined/aerodynamic shape so as to permit the vehicle 100 to reduce aerodynamic drag.

The motor 15 may be housed in the front of fuselage or body 14 and have a propeller 17 attached thereto. In an implementation, the motor 15 may be a 1000 kV electric motor driven by a 150 amp speed controller on electronics board 25. However, other motors or engines may be used without departing from the scope of the present disclosure. For example, in frigid conditions where batteries may not work well, a small gasoline engine may be used to power the vehicle 100. In an implementation, the propeller 17 may be an 11×17 (11 inch diameter, 7 inch pitch) propeller. However, the present disclosure is not limited to an 11×7 propeller and other propellers may be used depending on the size and weight of the vehicle 100. During operation, the speed controller may be used to control the speed that the motor 15 drives the propeller of the vehicle 100 to move the vehicle 100 forward over land, ice, snow, or water. The speed controller may be controlled by an operator with an RC transmitter, or may be controlled autonomously based on sensors (such as position sensors, cameras, etc.).

A vertical tail 24 is attached to a rear of the fuselage or body 14 to support a movable rudder 28. The tail 24 and the rudder 28 may be formed of any suitably lightweight material, such as carbon fiber, and may be formed using known techniques, such as 3D printing. During operation, the rudder 28 is used to control the direction of the vehicle 100, which may be controlled by an operator with an RC transmitter, or may be controlled autonomously based on sensors (such as position sensors, cameras, etc.).

The vehicle 100 is supported by and travels across the various surfaces on a pair of floats 22 and 23. Each float 22, 23 is formed of lightweight material such as foam or hollow carbon fiber. Floats 22 and 23 have an elongated ski-type shape with a flat bottom surface and an upwardly curved front portion. The flat bottom surfaces may include a layer of low-friction material to assist in sliding over various surfaces. Floats 22 and 23 are disposed below and spaced from the fuselage or body 14, and are disposed substantially parallel to the longitudinal axis L of the fuselage or body 14. Each float 22, 23 is typically approximately the same length as the fuselage or body 14 so as to spread out the weight evenly and provide stability to the vehicle 100.

A plurality of struts 12, 13 may be used to support the fuselage or body 14 above the floats 22, 23. In an implementation, a substantially arc-shaped front strut 12 is attached to floats 22, 23 at either end and is attached to the fuselage or body 14 at a central portion, and a substantially arc-shaped rear strut 13 is attached to a respective floats 22, 23 at either end and the fuselage or body 14 at a central portion. The struts 12 and 13 may be formed of lightweight material, such as carbon fiber, and may be formed with reinforcing elements to provide sufficient rigidity to the vehicle 100.

In use, the center of gravity and center of buoyancy of the vehicle 100 will be above the floats 22, 23. The present inventor has found it advantageous to position these elements relative to each other such that the vehicle 100 at top speed in the water will "porpoise" or oscillate vertically to cause additional harassment to waterfowl.

In an implementation wherein the fuselage or body 14, floats 22 and 23, tail 24, and rudder 28 are formed of carbon fiber, and a 1000 kV motor powers an 11×7 propeller, the vehicle 100 may be approximately 2 feet wide, approximately 2 feet tall, approximately 4-5 feet long, and may weigh approximately 4-5 pounds.

In one implementation, the vehicle 100 may be controlled by an operator with an RC transmitter using off the shelf RC controls. In other implementations, the vehicle may be autonomous or semi-autonomous, and use positioning sensors and mapping data to move in a programmed path, and/or use cameras/infrared sensors to detect waterfowl along the path and make deviation maneuvers from the path to harass the waterfowl. Autonomous implementations may include a charging dock, such as an inductive solar charging housing to which the vehicle 100 returns to for storage and charging.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc. s used herein, the adverb "approximately" means that a shape, structure, measurement, quantity, time, etc. may deviate up to +/−30%.

In general, the computing systems and/or devices described may employ any of a number of computer operating systems, including, but by no means limited to, versions and/or varieties of the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance. Examples of computing devices include, without limitation, an on-board first computer, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A vehicle, comprising:
   a body having an elongated shape with a front and a rear disposed on a longitudinal axis;
   a motor attached to the front the body;
   a vertical tail attached to the rear of the body;
   a rudder attached to the vertical tail;
   a propeller attached to the motor; and
   a pair of floats disposed below and spaced from the body, wherein the vehicle does not include any operational wings or wheels, and wherein a buoyancy of the pair of floats supports a weight of the vehicle in water.

2. The vehicle of claim 1, wherein each float has an elongated ski-type shape with a flat bottom and a upwardly curved front portion.

3. The vehicle of claim 2, wherein the pair of floats are disposed substantially parallel to the longitudinal axis of the body.

4. The vehicle of claim 3, further comprising a plurality of struts attaching the pair of floats to the body.

5. The vehicle of claim 4, wherein the plurality of struts include:
   a substantially arc-shaped front strut attached to a respective float at either end and the body at a central portion; and
   a substantially arc-shaped rear strut attached to a respective float at either end and the body at a central portion.

6. The vehicle of claim 1, wherein the body and the pair of floats are hollow and formed of carbon fiber.

7. The vehicle of claim 6, wherein the vertical tail and rudder are formed of carbon fiber.

8. The vehicle of claim 7, wherein the vehicle is approximately 2 feet wide, approximately 2 feet tall, and approximately 4-5 feet long and weighs approximately 4-5 pounds.

9. The vehicle of claim 1, wherein the body and the pair of floats comprise foam.

10. The vehicle of claim 9, wherein the tail and rudder comprise carbon fiber.

11. A vehicle, comprising:
    a fuselage having a front and a rear disposed along a longitudinal axis;
    a motor attached to the front the fuselage;
    a vertical tail attached to the rear of the fuselage;
    a rudder attached to the vertical tail;
    a propeller attached to the motor; and
    a pair of floats disposed below and spaced from the fuselage,
    wherein the vehicle does not include any operational wings or wheels, and wherein each float has an elongated ski-type shape with a flat bottom and a upwardly curved front portion.

12. The vehicle of claim 11, wherein the pair of floats are disposed substantially parallel to the longitudinal axis of the fuselage.

13. The vehicle of claim 12, further comprising a plurality of struts attaching the pair of floats to the fuselage.

14. The vehicle of claim 13, wherein the plurality of struts include:
   a substantially arc-shaped front strut attached to a respective float at either end and the fuselage at a central portion; and
   a substantially arc-shaped rear strut attached to a respective float at either end and the fuselage at a central portion.

15. The vehicle of claim 12, wherein the fuselage and the pair of floats are hollow and formed of carbon fiber.

16. The vehicle of claim 15, wherein the tail and rudder are formed of carbon fiber.

17. The vehicle of claim 12, further comprising a radio control (RC) receiver disposed in the fuselage for operatively controlling the motor and the rudder.

18. The vehicle of claim 17, wherein the motor is a 1000 kV electric motor driven by a 150 amp speed controller connected to the RC receiver and powered by a rechargeable battery.

19. The vehicle of claim 18, wherein the propeller has an 11 inch diameter and a 7 inch pitch (11×7).

* * * * *